UNITED STATES PATENT OFFICE.

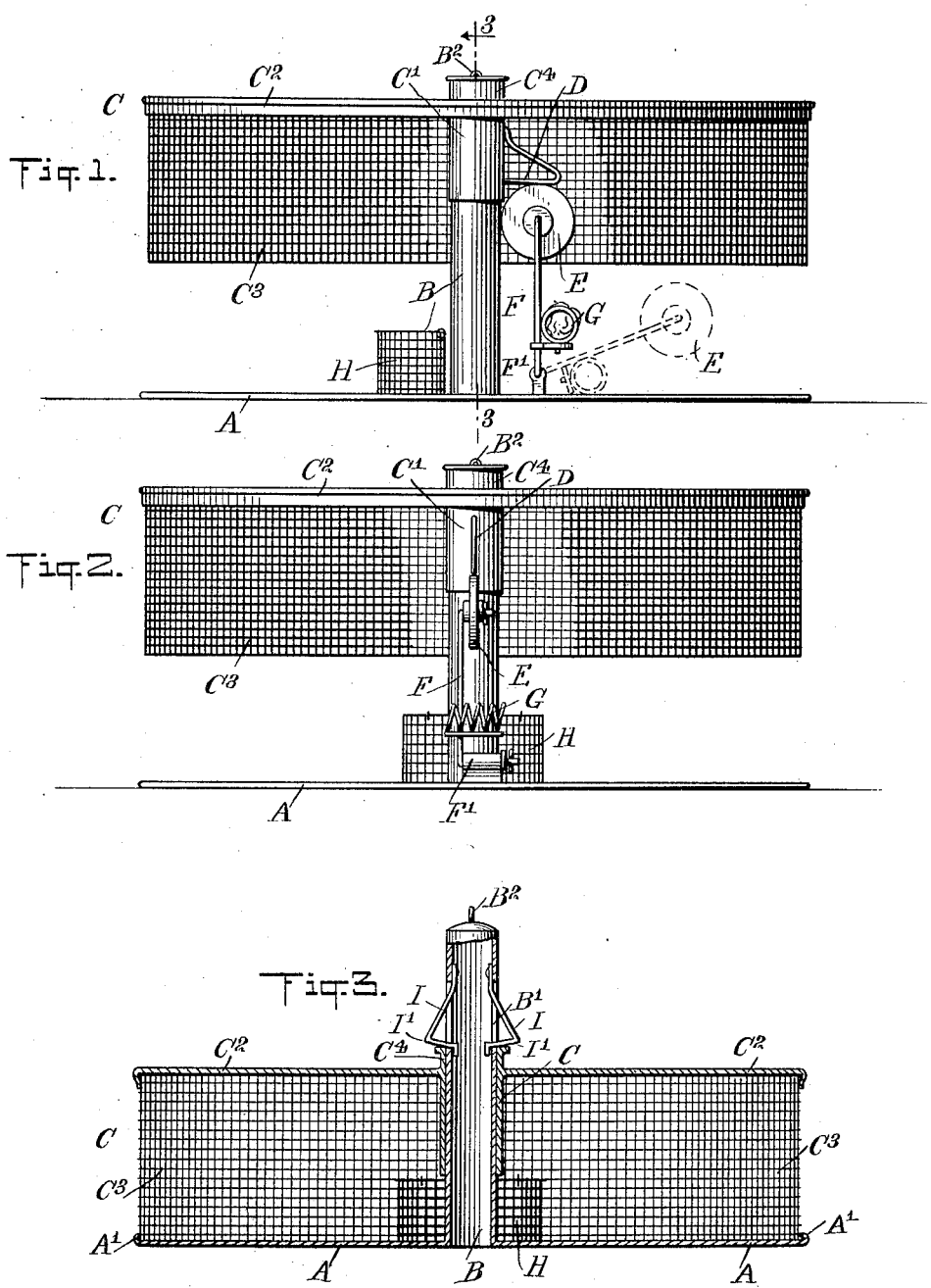

JOHN DE ST. LEGIER, OF HICKSVILLE, NEW YORK.

ANIMAL-TRAP.

1,088,477.

Specification of Letters Patent.    Patented Feb. 24, 1914.

Application filed June 25, 1913. Serial No. 775,663.

*To all whom it may concern:*

Be it known that I, JOHN DE ST. LEGIER, a citizen of the United States, and a resident of Hicksville, in the county of Nassau and State of New York, have invented a new and Improved Animal-Trap, of which the following is a full, clear, and exact description.

The object of the invention is to provide a new and improved animal trap, which is simple and durable in construction, exceedingly sensitive and arranged for trapping large or small animals, such as mammals and birds, and arranged to provide access to the trap from any direction when in set position, and to trap an animal alive and without danger of injury to its valuable fur or feathers.

In order to accomplish the desired result use is made of a base provided with upwardly-extending guiding means, a bottomless cage mounted to slide up and down on the said guiding means, a supporting and releasing device for supporting the said cage bodily a distance above the said base and for releasing the said cage to allow the latter to drop down onto the said base, and locking means for locking the said cage in trapped closed position.

A practical embodiment of the invention is represented in the accompanying drawings forming a part of this specification, in which similar characters of reference indicate corresponding parts in all the views.

Figure 1 is a side elevation of the animal trap with the cage raised and set and parts of the cage broken out. Fig. 2 is a front elevation of the same; and Fig. 3 is a central section of the same on the line 3—3 of Fig. 1.

The base A of the animal trap is preferably flat and supports in its center a post B on which is mounted to slide the hub C' of a bottomless cage C, preferably provided with a solid top $C^2$ and a rim $C^3$ depending from the top $C^2$ and preferably formed of wire netting or the like. When the animal trap is set the cage C is in raised position, as plainly indicated in Fig. 1, and in order to hold or support the cage in this position and to release the cage to allow the latter to drop, the following arrangement is made: On the hub C' of the cage C is secured a lateral arm D adapted to rest on the peripheral edge of a roller E mounted to turn on the free end of a lever F fulcrumed at F' on the base A adjacent the post B. On the lever F intermediate its fulcrum F' and the roller E is arranged a bait holder G, preferably in the form of a coil of wire, into which the meat or other bait is screwed so that the ends of the meat project at the ends of the coil. In order to hold the cage C in raised position the lever F is swung upward into approximately vertical position with the arm D resting on top of the peripheral edge of the roller E.

When an animal steps onto the base A and pulls on the bait held in the bait holder G then a downward swinging movement is given to the lever F so that the roller E rolls out from under the arm D to allow the cage C to drop and thus confine the animal within the cage. It is understood that when the cage C drops the lower edge of its rim $C^3$ moves into engagement with the upper surface of the base A so that the latter now closes the bottom of the cage to prevent the escape of the trapped animal. The base A is preferably provided with an upturned flange A' immediately outside of the lower edge of the rim $C^3$ at the time the later rests on the base A to prevent lifting of the cage by animals from the outside.

It will be noticed that when the cage C is in raised position, as shown and described, free access is had from all around the cage to the interior thereof, and in order to attract a number of animals at a time use is preferably made of a second bait holder H, of wire netting, and attached to the base A adjacent the post B and at the side opposite from the one on which the lever F is located.

In order to lock the cage C when in trapped closed position, the following arrangement is made: On the upper end of the post B are secured springs I preferably secured at their upper ends to the post at the inside thereof, the post being for this purpose made hollow and provided with slots B' for the passage of the springs I. The lower ends of the springs I are provided with inwardly-extending angular lugs I' adapted to rest on the top extension $C^4$ of the hub C' at the time the cage C is in lowermost position and the lower edge of the rim $C^3$ rests on the base A. When it is desired to raise the cage C into set position it is necessary for the operator to press the springs I inwardly to allow the hub C' to slide up on the post the desired distance, that is, until the arm D rests on the roller E now in uppermost position, by the operator swinging the lever F into a vertical position. The springs I are confined within the post B by the action of the hub C' as long as the cage C is in raised position, but when the cage C drops down into closed position then the springs I are released from the hub C' and swing outward so that the lugs I' engage the top of the hub extension C⁴ thus holding the cage C against upward movement so as to prevent the trapped animals from escaping.

By providing a roller E for the arm D to rest on an exceedingly sensitive connection is had, as it requires but little power to swing the lever F downward to disengage the roller E from the arm D as the said roller turns freely on the lever F. By providing the bait holder G in the form of a coil of wire a piece of meat can be readily screwed into the coil so that portions of the meat project between adjacent convolutions of the coil, whereby the convolutions are practically hidden and consequently the bait holder is rendered practically invisible. It will also be noticed that by constructing the bait holder G in the manner described the bait cannot easily be pulled out by an animal as it is securely held by the convolutions of the coil.

The trap shown and described is very simple in construction, composed of comparatively few parts, not liable easily to get out of order, and the trap can be readily set for trapping large or small animals such as quadrupeds and birds.

The upper end of the post B is preferably provided with an eye B² for the attachment of a string to allow of suspending the trap from a suitable support instead of resting it on the ground, and to allow of submerging the trap with the animals in water for drowning the trapped animals whenever it is desired to do so.

Although the animal trap shown is circular in shape it is evident that any desired shape may be given to the trap, and it may be made of any suitable material.

Having thus described my invention, I claim as new and desire to secure by Letters Patent:

1. An animal trap, comprising a base provided with a central guide post, a bottomless cage mounted to slide up and down on the said guide post, the lower edge of the said cage resting on the said base at the time the cage is in lowermost position and the said lower edge of the cage being a distance above the said base at the time the cage is raised to provide an annular entrance to the interior of the trap, a lever fulcrumed on the said base and provided at its free end with a friction roller, and an arm on the said cage and adapted to rest on the peripheral edge of the said roller at the time the cage is in raised position, the said lever being provided intermediate its fulcrum and the said roller with a bait holder.

2. An animal trap provided with a cage having vertical movement and a supporting and tripping mechanism for the said cage to support the latter in raised position and to allow the cage to drop, the said mechanism comprising a lever with a bait holder on the lever intermediate the ends thereof, a roller on the free end of the lever, and an arm on the cage adapted to rest on the peripheral edge of the roller to support the cage in raised position at the time the lever is in upright position.

In testimony whereof I have signed my name to this specification in the presence of two subscribing witnesses.

JOHN DE ST. LEGIER.

Witnesses:
FRED HENRY REINHARD,
FREDERICK SAUNDERS.

---

Copies of this patent may be obtained for five cents each, by addressing the "Commissioner of Patents, Washington, D. C."